US007279546B2

(12) United States Patent
White et al.

(10) Patent No.: US 7,279,546 B2
(45) Date of Patent: Oct. 9, 2007

(54) HYDROXY-FUNCTIONAL POLYESTERS

(75) Inventors: Jerry E. White, Lake Jackson, TX (US); Zenon Lysenko, Midland, MI (US); Jimmy D. Earls, Lake Jackson, TX (US); Marvin L. Dettloff, Lake Jackson, TX (US); James A. Rabon, Jr., West Colombia, TX (US); Leonardo C. Lopez, Midland, MI (US)

(73) Assignee: Dow Global Technologies, Inc., Midland, MI (US)

( * ) Notice: Subject to any disclaimer, the term of this patent is extended or adjusted under 35 U.S.C. 154(b) by 262 days.

(21) Appl. No.: 10/484,419

(22) PCT Filed: Jul. 16, 2002

(86) PCT No.: PCT/US02/22839

§ 371 (c)(1),
(2), (4) Date: Jan. 16, 2004

(87) PCT Pub. No.: WO03/008476

PCT Pub. Date: Jan. 30, 2003

(65) Prior Publication Data

US 2004/0185283 A1    Sep. 23, 2004

Related U.S. Application Data

(60) Provisional application No. 60/305,676, filed on Jul. 16, 2001.

(51) Int. Cl.
   C08G 63/00     (2006.01)
   C08L 67/00     (2006.01)
(52) U.S. Cl. .................. 528/361; 525/187; 525/449
(58) Field of Classification Search .............. None
   See application file for complete search history.

(56) References Cited

U.S. PATENT DOCUMENTS

| 3,184,439 | A |   | 5/1965  | Brack ........................ 260/78.4 |
| 4,742,087 | A | * | 5/1988  | Kluth et al. ................. 521/107 |
| 5,171,820 | A | * | 12/1992 | Mang et al. .................. 528/87 |
| 5,496,910 | A | * | 3/1996  | Mang et al. .................. 528/88 |
| 5,780,582 | A | * | 7/1998  | Wang et al. ................. 528/365 |
| 5,852,078 | A | * | 12/1998 | Willett et al. ................ 524/35 |

FOREIGN PATENT DOCUMENTS

| EP | 04168150 | 6/1992 |
| GB | 1264755  | 2/1972 |

OTHER PUBLICATIONS

Warwel etal., "Ring-opening polymerization of oleochemical epoxides catalyzed by aluminoxane/acetyl acetone," European Polymer Journal, vol. 36, 2000, pp. 2655-2663.*

Warwel et al., "Photoinitiated cationic oligomerization of terminal and internal epoxides," European Journal of Lipid Science and Technology, vol. 103, 2001, pp. 133-140.*

CAPLUS accession No. 1985:186413 of the Journal of Polymer Science, Polymer Chemistry Edition article by Bansleben et al., "Poly(alkylene oxide) ionomers. XI. Polymerization and copolymerization of methyl-w-epoxyundecanoate and characterization of the polymers," vol. 23, No. 3, 1985, abstract.*

CAPLUS accession No. 2001:454766 of the Journal of Macromolecular Science, Pure and Applied Chemistry article by Vogl and Kiliman, "Poly(10,11-epoxyundecanoic acid), poly(5,6-epoxyhexanoic acid), and some of their derivatives," vol. A38, No. 2, 2001, abstract.*

CAPLUS accession No. 2001:454781 of the Journal of Macromolecular Science, Pure and Applied Chemistry, "Liquid crystalline polymers of derivatives of poly(10,11-epoxyundecanoic) acid, poly(5,6-epoxyhexanoic) acid and poly(10-undecenoic acid," vol. A38, No. 4, 2001, abstract.*

(Continued)

*Primary Examiner*—Robert Sellers

(57) ABSTRACT

The present invention provides thermoplastic hydroxy-functional polyesters. The polyesters have at least 10 sequential units, wherein the sequential units consist of units selected from units represented by the following formula (1) and units represented by the following formula (2); Wherein each of $R^1$ independently represents hydrogen or a substituted or unsubstituted homoalkyl or heteroalkyl group; each of $R^2$ independently represents hydrogen or a substituted or unsubstituted homoalkyl or heteroalkyl group; each of $R^3$ independently represents hydrogen or a substituted or unsubstituted homoalkyl or heteroalkyl group; Each of $R^4$ independently represents a substituted or unsubstituted homoalkyl or heteroalkyl group; and said moiety having no fewer than 1 unit represented by formula (1) and no fewer than 1 unit represented by formula (2). The present invention further provides processes for making hydroxyfunctional polyesters, such as polymerizing epoxidized fatty acids in the presence of an onium salt, and compositions and articles that include or are derived from the hydroxyfuntional polyesters

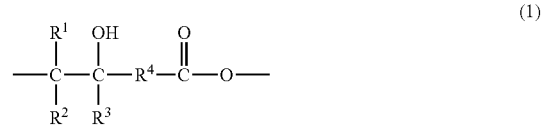

(1)

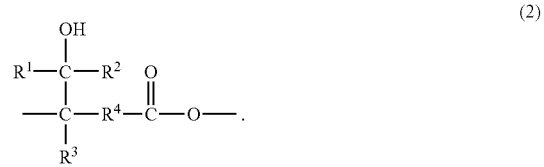

(2)

19 Claims, No Drawings

OTHER PUBLICATIONS

Ol'khov, A.A. et al.; "A self-degrading film based on a blend of polyethylene and polyhydroxybutyrate", International Polymer Science and Technology, vol. 25, No. 8, 1998.

Swem, Dariel et al., "Chemistry of Epoxy Compounds. VI. Thermal Polymerization of the Isomeric 9,10-Epoxystearic Acids", Journal of the American Chemical Society, vol. 70, Mar. 1948 pp. 1228-1235.

Chiellini E. et al., "Evaluation of Biodegradability of Poy (Epsilon-Caprolactone)/Poly(Ethylene Terephthalate) Blends", Rapra Abstracts, Pergamon Press Ltd. Oxford, vol. 33, No. 7, Jul. 1996, p. 175.

Encyclopedia of Polymer Science and Engineering vol. 6, pp. 331-332 (1986).

* cited by examiner

HYDROXY-FUNCTIONAL POLYESTERS

CROSS-REFERENCE TO RELATED APPLICATION

This application is a U.S. National Phase of PCT Application Ser. No. PCT/US02/22839 filed Jul. 16, 2002. which claims priority from U.S. Application Ser. No. 60/305,676, filed Jul. 16. 2001, now expired.

FIELD OF THE INVENTION

The present invention relates to hydroxy-functional polyesters, to processes for their preparation, and to compositions and articles comprising the hydroxy-functional polyesters.

BACKGROUND OF THE INVENTION

Hydroxy-functional polyesters prepared from epoxidized aliphatic acids are mentioned in U.S. Pat. No. 3,184,439 to Brack and in the article of Swern et al. in the Journal of the American Chemical Society, volume 70, year 1948, page 1228 et seq. However, these polyesters are either of low molecular weight or they are thermosets (i.e. substantially crosslinked), making them unsuitable for a wide variety of applications.

It is an object of the present invention to provide high molecular weight thermoplastic hydroxy-functional polyesters. It is a further object of the present invention to provide high molecular weight thermoplastic hydroxy-functionalized polyesters derived from epoxidized fatty acids.

Traditional polymers, including polyesters, have been derived largely from petroleum. As a source material, petroleum presents costs and problems in the form of pollution, waste disposal, and environmental remediation, much of which have been associated with cracking and refining of this non-renewable resource. Consequently, the modern chemical industries have been seeking to develop "green chemistry" in which less costly and less problematic source, preferably renewable sources, provide a replacement for petroleum in many applications. As part of this effort, it is an industry recognized goal to obtain alternative routes to polymers identical to petroleum-based polymers, and to obtain novel routes to polymers at least functionally equivalent thereto.

The use of epoxidized fatty acids in the polymerization of polyesters according to the present invention thus meets a need in the field of thermoplastic polymers, since epoxidized fatty acids may be obtained directly from renewable sources such as seed oils (e.g., vernolic acid) and/or may be readily prepared from such sources (e.g., by epoxygenation of double bonds in unsaturated fatty acids). Thus, renewable sources of fatty acids and fatty acid esters (e.g., mono-, di-, and tri-acyl glycerols) can thereby provide starting materials for polyesters according to the present invention.

SUMMARY OF THE INVENTION

One aspect of the present invention relates to thermoplastic polyesters comprising at least one moiety having at least 10, preferably at least 20, and more preferably at least 50 sequential units, said sequential units consisting of units represented by the following formula (1) and units represented by the following formula (2),

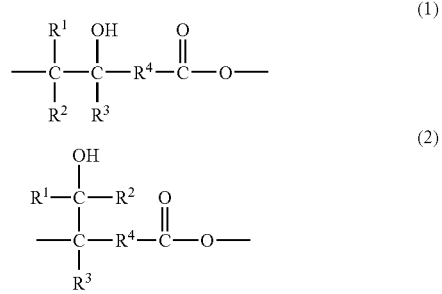

wherein
each of $R^1$ independently represents hydrogen or a substituted or unsubstituted homoalkyl or heteroalkyl group;
each of $R^2$ independently represents hydrogen or a substituted or unsubstituted homoalkyl or heteroalkyl group;
each of $R^3$ independently represents hydrogen or a substituted or unsubstituted homoalkyl or heteroalkyl group;
each of $R^4$ independently represents a substituted or unsubstituted homoalkyl or heteroalkyl group; and
said moiety having no fewer than 1 unit represented by formula (1) and no fewer than 1 unit represented by formula (2).

Polyesters of this structure wherein $R^4$ are selected from groups containing up to about 40 carbon atoms, or more. Polyesters of this structure wherein $R^4$ are selected from saturated groups containing 8 carbon atoms. Polyesters of this structure wherein $R^4$ are selected from unsaturated groups containing at least 4 carbon atoms. Polyesters of this structure wherein at least one $R^1$, $R^2$, or $R^3$ is substituted with a substituent selected from the group consisting of hydroxyl, cyano, nitro, chloro, bromo, and fluoro. Polyesters of this structure and wherein at least one of $R^1$, $R^2$, and $R^3$ is (uniformly) so substituted. Polyesters of this structure wherein each $R^\#$ moiety of a given formula (for formula (1) and for formula (2)) is identical, independently for each of $R^1$-$R^4$. Polyesters of this structure wherein each $R^\#$ moiety of a given number is identical between formulas (1) and (2). Polyesters of this structure wherein each of $R^1$, $R^2$, and $R^3$ represents hydrogen or a group 1-21 carbon group. Polyesters of this structure wherein all of $R^1$-$R^3$ are identical. Polyesters of this structure wherein all of $R^1$-$R^3$ are hydrogen. Polyesters of this structure wherein all $R^4$ are identical.

Polyesters of this structure wherein each $R^4$ is selected from the groups represented by the following formula (6):

$$\text{-[(CH}_2)_r\text{---CH=CH---(CH}_2)_s]_t\text{-} \quad (6)$$

wherein
r represents an integer of 0 to 20;
s represents an integer of 0 to 20;
r+s=at least 2; and
t represents an integer of 1 to 4.

Polyesters of this structure, wherein each $R^4$ is selected from the groups represented by the following formulas (4) and (5):

$$\text{---(CH}_2)_q\text{---} \quad (4)$$

$$\text{-[(CH}_2)_r\text{---A---(CH}_2)_s]_t\text{-} \quad (5)$$

wherein
q represents an integer of 1 to 30;
r represents an integer of 0 to 20;
s represents an integer of 0 to 20;
r+s=at least 1;
t represents an integer of 1 to 4; and
A represents sulfur, oxygen, or carbonyl.

The present invention also provides processes for making thermoplastic, hydroxyfunctional, high molecular weight polyesters, having a weight average molecular weight of at least 5,000 g/mol, such as processes comprising polymerizing epoxidized fatty acids in the presence of a suitable catalyst (preferably an onium salt, such as tetrabutylammonium bromide or ethyltriphenylphosphonium bromide) and optionally a solvent (preferably an ether, an ether ester, or a hydroxylated ether solvent, such as diglyme).

In addition, the present invention relates to articles and compositions comprising or made from the polyesters of the present invention, and methods using the polyesters for forming compositions, and methods using the polyesters and/or compositions for forming articles.

In addition, the present invention provides polyesters, polyester-containing compositions and articles, and compositions and articles made from polyesters, and articles containing or made from said compositions, wherein the same is ultimately derived from a renewable resource, preferably a plant oil.

The present invention also provides a process for adhering a first area of a first article to a second area of a second article (said articles being either different objects or the same object), at least one of said first area and said second area comprising the polyester according to the present invention, and the process comprising:

(i) bringing said first area into contact with said second area; and subsequently
(ii) applying energy in the 100 kHz-1500 MHz radio frequency range to said first area and said second area.

An article obtainable by this process, preferably a sealed container, such as a sealed bag or a sealed pouch.

DETAILED DESCRIPTION OF THE INVENTION

Fatty acids refers herein to aliphatic carboxylic acids. The fatty acids may be branched or unbranched and saturated or unsaturated. Preferably the fatty acids comprise at least 4 carbon atoms, more preferably at least 7 carbon atoms, yet more preferably at least 10 carbon atoms. In a preferred embodiment, the fatty acids comprise up to about 40 carbon atoms, more preferably up to about 30 carbon atoms, more preferably up to about 20 carbon atoms, more preferably up to about 18 carbon atoms; more preferably up to about 15 carbon atoms. In an alternate preferred embodiment, fatty acids comprising even larger numbers of carbon atoms than about 40 may be used.

In a preferred embodiment, a fatty acids will be selected from 11 carbon atom fatty acids. Particularly preferred is, for instance, 10-undecenoic acid. Preferred fatty acids for use in forming epoxidized fatty acids are unsaturated fatty acids; preferably a mono, di-, tri-, or tetra-unsaturated fatty acid is used, more preferably a mono- or di-unsaturated fatty acid, and even more preferably a mono-unsaturated fatty acid. In a preferred embodiment, at least one unsaturation is located at the terminal position in the main chain of the fatty acid molecule, i.e. the molecule is an omega-unsaturated fatty acid. Particularly preferred are mono-unsaturated omega fatty acids. In a preferred embodiment, 10-undecenoic acid is used. Particularly epoxidized fatty acids are omega-epoxy fatty acids. In a preferred embodiment, the epoxidized fatty acid formed therefrom is 10,11-epoxyundecanoic acid.

A homoalkyl group refers herein to an alkyl group consisting essentially of carbon and hydrogen atoms. A heteroalkyl group refers herein to an alkyl group which further comprises other atoms, which may be present either in the main chain or, preferably, as substituents. Such other atoms include, for instance, oxygen, nitrogen, sulfur, and halogen atoms. Preferably at least 40 wt % of the heteroalkyl group is comprised of carbon and hydrogen, more preferably at least 60 wt %, even more preferably at least 80 wt %, and most preferably at least 90 wt %. Both the homoalkyl and heteroalkyl groups may include cyclic structures and/or unsaturated bonds. This use of the term alkyl also means, e.g., that the carbon chain of the group may be attached or attachable to more than one other moiety, i.e. the alkyl group may be a mono-yl, di-yl, or tri-yl, or poly-yl alkyl group. Thus, when used in reference to structural formulas, each occurrence of the terms homoalkyl group and heteroalkyl group is independently defined as being capable of forming as many bonds as the structural formula permits or requires. Also, as used herein in regard to the assignment of chemical groups to chemical formulas, the term "corresponds" is defined as meaning "is respectively identical to."

The present invention provides thermoplastic polyesters comprising a moiety having at least 10, preferably at least 20, and more preferably at least 50 sequential units, said sequential units consisting of units represented by formula (1) [hereinafter "formula (1) units"] and units represented by formula (2) [hereinafter "formula (2) units"]:

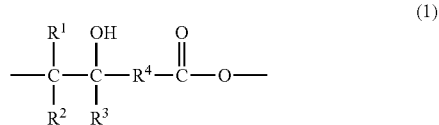

(1)

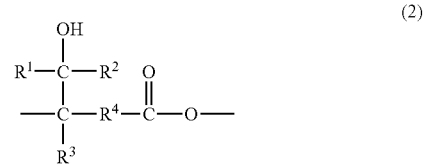

(2)

wherein
each of $R^1$ independently represents hydrogen or a substituted or unsubstituted homoalkyl or heteroalkyl group;
each of $R^2$ independently represents hydrogen or a substituted or unsubstituted homoalkyl or heteroalkyl group;
each of $R^3$ independently represents hydrogen or a substituted or unsubstituted homoalkyl or heteroalkyl group;
each of $R^4$ independently represents a substituted or unsubstituted homoalkyl or heteroalkyl group; and
said moiety having no fewer than 1 unit represented by formula (1) and no fewer than 1 unit represented by formula (2).

The moiety comprises mixtures of formula (1) units and formula (2) units. In one embodiment, the formula (1) units and formula (2) units are randomly distributed. In another embodiment, the moiety comprises a block of formula (1) units connected to a block of formula (2) units.

In a preferred embodiment of the thermoplastic polymer: for all units of formula (1), all $R^1$ are identical, all $R^2$ are identical, and all $R^3$ are identical; and independently for all units of formula (2), all $R^1$ are identical, all $R^2$ are identical, and all $R^3$ are identical. In a preferred embodiment, for all units of formula (1), all $R^4$ are identical; and independently for all units of formula (2), all $R^4$ are identical.

It is preferred that the moiety comprises only one type of formula (1) units and only one type of formula (2) units. In other words, it is preferred that all formula (1) units within the moiety are identical and that all formula (2) units within the moiety are identical. Furthermore, it is preferred that $R^1$, $R^2$, $R^3$, and $R^4$ in formula (1) correspond to $R^1$, $R^2$, $R^3$, and $R^4$ in formula (2). Accordingly, it is preferred: that $R^1$ in the formula (1) unit ["$R^1(1)$"] represents the same group as $R^1$ in the formula (2) unit ["$R^1(2)$"], that $R^2(1)$ represents the same group as $R^2(2)$, that $R^3(1)$ represents the same group as $R^3(2)$, and that $R^4(1)$ represents the same group as $R^4(2)$.

In one embodiment, the ratio of the number of formula (1) units to the number of formula (2) units in the moiety is in the range of 1:9 to 9:1. In another embodiment, the ratio is in the range of 1:3 to 3:1.

Preferably, the moiety comprises less than 10,000 sequential units selected from the group consisting of formula (1) units and formula (2) units. Generally, the moiety comprises less than 2,000 sequential units selected from the group consisting of formula (1) units and formula (2) units.

Preferably, the present polyesters have a weight average molecular weight of at least 5,000 g/mol, more preferably at least 20,000 g/mol, even more preferably at least 50,000 g/mol, and most preferably at least 80,000 g/mol.

$R^1$, $R^2$, and $R^3$ may comprise any suitable substituents as defined above. Preferred substituents for homoalkyl groups include, for instance, methyl, ethyl, and propyl groups. Preferred substituents for heteroalkyl groups further include, for instance, hydroxyl, nitro, cyano, and halogen groups. Preferably, $R^1$, $R^2$, and $R^3$ independently represent hydrogen or a group represented by the following formula (3):

$$CH_3-(CH_2)_a- \qquad (3)$$

wherein a represents an integer from 0 to 20.

In a preferred embodiment, each of $R^1$, $R^2$, and $R^3$ may be selected from hydrogen and linear, saturated homoalkyl groups of 4 or fewer carbon atoms; in a preferred embodiment, each of $R^1$, $R^2$, and $R^3$ may be selected from hydrogen and saturated homoalkyl groups of 2 or fewer carbon atoms; in a preferred embodiment, each of $R^1$, $R^2$, and $R^3$ represents hydrogen.

$R^4$ may be a saturated group, for instance a saturated group selected from the group consisting of groups represented by the following formulas (4) and (5):

$$-(CH_2)_q- \qquad (4)$$

$$-[(CH_2)_r-A-(CH_2)_s]_t- \qquad (5)$$

wherein
q represents an integer of 1 to 30, preferably from 1 to 20, more preferably from 5 to 20, most preferably from 10 to 15;
r represents an integer of 0 to 20, preferably from 1 to 15, more preferably from 2 to 10 and most preferably from 3 to 8;
s represents an integer of 0 to 20, preferably from 1 to 15, more preferably from 2 to 10 and most preferably from 3 to 8;
r+s=at least 1, preferably at least 3, more preferably at least 6;

t represents an integer of 1 to 4, preferably 1 to 2, and more preferably t represents 1; and
A represents sulfur, oxygen, or carbonyl.

Preferably a saturated R4 group will contain at least 2 carbon atoms, more preferably at least 4 carbon atoms, more preferably at least 7 carbon atoms. In a preferred embodiment, a saturated R4 group will contain about 40 carbon atoms or fewer, more preferably about 30 carbon atoms or fewer, more preferably about 20 carbon atoms are fewer, more preferably about 15 carbon atoms or fewer, more preferably about 12 carbon atoms or fewer. In a preferred embodiment, each R4 will comprise a linear, saturated homoalkyl group of 8 carbon atoms.

$R^4$ can be an unsaturated group, for instance an unsaturated group represented by the following formula (6):

$$-[(CH_2)_r-CH=CH-(CH_2)_s]_t- \qquad (6)$$

wherein
r represents an integer of 0 to 20, preferably from 1 to 15, more preferably from 2 to 10 and most preferably from 3 to 8;
s represents an integer of 0 to 20, preferably from 1 to 15, more preferably from 2 to 10 and most preferably from 3 to 8;
r+s=preferably at least 1, more preferably at least 3, most preferably at least 6;
t represents an integer of 1 to 4, preferably t represents 1 or 2, and more preferably t represents 1.

The present polyesters exhibit a low oxygen transmission rate and exhibit good adhesion characteristics (such as good T-peel and lap shear strengths). The present polyesters preferably have an oxygen transmission rate, as measured according to ASTM Method D3985-81, of below 200 cc*mil/100 in²*day*atm (i.e. below about $7.77 \times 10^{-4}$ cc*mm/m²*Pa*day), more preferably below 100 cc*mil/100 in²*day*atm (i.e. below about $3.89 \times 10^{-4}$ cc*mm/m²*Pa*day), even more preferably below 50 cc*mil/100 in²*day*atm (i.e. below about $1.9 \times 10^{-4}$ cc*mm/m²*Pa*day), and most preferably below 20 cc*mil/100 in²*day*atm (i.e. below about $7.7 \times 10^{-5}$ cc*mm/m²*Pa*day). The T-peel strength of the present polyesters on aluminum is preferably at least 1 N/mm, more preferably at least 1.2 N/mm. The lap shear strength of the present polyesters on aluminum is preferably at least 3 MPa, more preferably at least 6 MPa, and even more preferably at least 9 MPa.

Furthermore, the Young's modulus of the present polyesters, as determined according to ASTM method D882, is preferably at least 150 MPa. The inherent viscosity of the present polyesters, as determined according to ASTM method D2857-95, is preferably at least 0.25 dl/g, more preferably at least 0.30 dl/g, and even more preferably at least 0.35 dl/g. The elongation at break of the present polyesters, as determined according to ASTM method D882, is preferably more than 200%. Furthermore, the water vapor transmission rate at steady state of the present polyesters, as determined according to ASTM method F-1249-90, is preferably below 50 g*mil/100 in²*day (i.e. below about 19.7 g*mm/m²*day), more preferably below 25 g*mil/100 in²*day (i.e. below about 9.8 g*mm/m²*day).

Alternative Structures Describing the Polyesters

Polyesters according to the present invention are described with reference to those comprising at least one moiety having at least 10 sequential units, wherein the sequential units consist of units selected from units represented by formula (1) and units represented by formula (2).

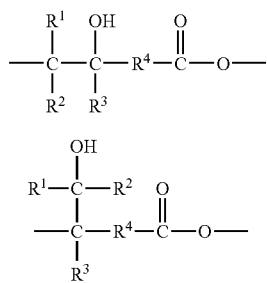

(1)

(2)

This combination of structural formulas is selected for convenience and clarity in describing the elements of the present invention. However, as is well understood in the art, a given structure or set of structures may be described by means of different formulas with no change in the structure being described. Thus, the very same polyesters as described herein with reference to units of formula (1) and units of formula (2) alternatively may be described with reference to other formulas.

Consequently, in one alternative description, polyesters according to the present invention may be described equally well with reference to those comprising at least one moiety having at least 10 sequential units, wherein the sequential units consist of units selected from units represented by formula (21) and units represented by formula (22):

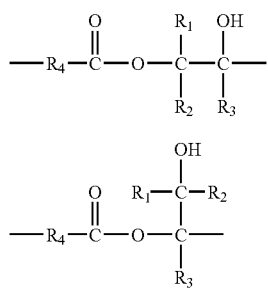

(21)

(22)

wherein $R_1$, $R_2$, $R_3$, and $R_4$ are respectively defined in a manner identical to $R^1$, $R^2$, $R^3$, and $R^4$ of formulas (1) and (2).

This is more readily apparent from a consideration of epoxidized fatty acids and their use in polymerization. As described in more detail below, a process for making polyesters according to the present invention involves polymerizing epoxidized fatty acids. In a preferred embodiment, the epoxidized fatty acids include those represented by formula (7.5):

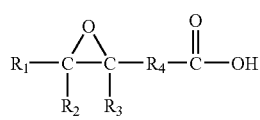

(7.5)

wherein $R_1$, $R_2$, $R_3$, and $R_4$ are respectively defined in a manner identical to $R^1$, $R^2$, $R^3$, and $R^4$ of formulas (1) and (2). In a preferred embodiment, each of $R_1$ and $R_2$ is hydrogen. In a preferred embodiment, each of $R_1$, $R_2$, and $R_3$ is hydrogen. Preferably, the epoxidized fatty acids used in a process for making polyesters according to the present invention have a purity of at least 90%, more preferably at least 93%, even more preferably at least 96%, and most preferably at least 98%.

When such epoxidized fatty acids are used in a process for making polyesters according to the present invention, ring-opening polymerization of the epoxy group takes place by attack of the hydroxyl oxygen upon the epoxy group. However, this attack may occur at either of the epoxy carbon atoms. This results in a combination of two types of linked structures in the growing polyester chain (as well as in the polyester produced), as can be seen in the dimeric structures represented by formulas (31) and (32):

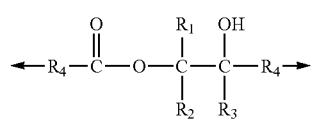

(31)

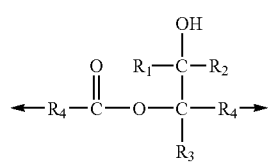

(32)

wherein $R_1$, $R_2$, $R_3$, and $R_4$ are respectively defined in a manner identical to $R^1$, $R^2$, $R^3$, a $R^4$ of formulas (1) and (2); wherein left arrows indicate the direction toward an epoxy terminus of the growing polyester chain; and wherein right arrows indicate the direction toward a carboxy terminus of the growing polyester chain.

As a polymerization reaction proceeds, combinations of these two types of structures can be formed. Thus, e.g., four representative types of trimers, each containing two of the linked structures of formulas (31) and (32), may be formed, as can be seen in the trimeric structures represented by formulas (41), (42), (43), and (44):

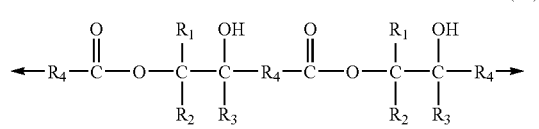

(41)

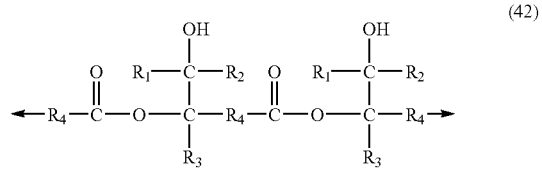

(42)

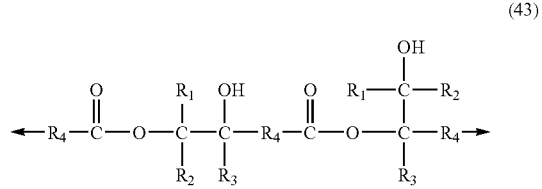

(43)

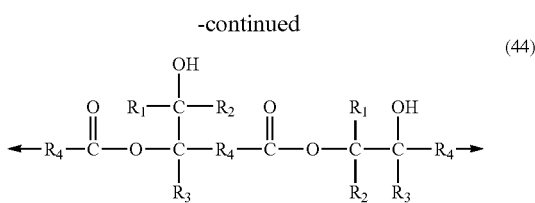

wherein $R_1$, $R_2$, $R_3$, and $R_4$, left arrows, and right arrows are defined as above for formulas (31) and (32). In these trimers: the structure represented by formula (1) may be seen, e.g., in the central portion of formulas (41) and (43), and the structure represented by formula (2) may be seen, e.g., in the central portion of formulas (42) and (44); while the structure represented by formula (21) may be seen, e.g., in the left portion of formulas (41) and (43), and the structure represented by formula (22) may be seen, e.g., in the left portion of formulas (42) and (44).

Therefore, reference to the pair of formulas (1) and (2) serves equally well as would reference to the pair of formulas (21) and (22), in describing polyesters according to the present invention. Polyesters according to the present invention are equally well described as those comprising at least one moiety having at least 10 sequential units, wherein the sequential units consist of units selected from either pair of formulas. For purposes of the present invention, these descriptions are synonymous.

Process for Making the Polyesters

The present polyesters may be obtained by polymerizing epoxidized fatty acids in the presence of a suitable catalyst. Preferred epoxidized fatty acids include those represented by formula (7.5) above. Particularly preferred epoxidized fatty acids include those represented by the following formula (7):

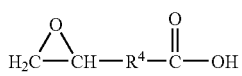 (7)

wherein $R^4$ is as defined above.

The epoxidized fatty acids preferably have a purity of at least 90%, more preferably at least 93%, even more preferably at least 96%, and most preferably at least 98%. In a preferred embodiment, the epoxidized fatty acids are obtained from or derived from a renewable resource; preferably from one or more plant oils; more preferably from one or more seed oils; more preferably from one or more oilseed oils.

Thus, in a preferred embodiment, a polyester according to the present invention is prepared using renewable resources, i.e. prepared using epoxidized fatty acids obtained from or derived from such renewable resource(s). In a preferred embodiment, most of the epoxidized fatty acids used are obtained from or derived from such renewable resource(s); in a particularly preferred embodiment, substantially all or all of the epoxidized fatty acids used are obtained from or derived from such renewable resource(s). As a result, in a preferred embodiment, a composition or article made from or made by use of said polyester is, at least in part, obtained from or derived from such renewable resource(s); and a process for preparing the polyester, composition, or article preferably uses such renewable resource(s).

Preferred catalysts include onium salts, for example, ammonium salts and phosphonium salts. In a preferred embodiment, the ammonium salt is a tetraalkyl-ammonium salt, more preferably a tetraalkyl-ammonium halide. Particularly preferred ammonium salts are tetrabutylammonium halides, e.g., tetrabutylammonium bromide. In a preferred embodiment, the phosphonium salt is an alkyl-aryl-phosphonium salt, preferably a monoalkyl-triaryl-phosphonium salt, more preferably a monoalkyl-triaryl-phosphonium halide, e.g., ethyltriphenylphosphonium bromide.

The reaction may take place in the presence of a suitable solvent, preferably a solvent capable of dissolving both the epoxidized fatty acid and the product polyester at polymerization temperatures. Preferred solvents include etheric, ester etheric, ester or hydroxylated etheric solvents. Examples of preferred solvents include, for instance, dioxane, propylene glycol methyl ether acetate, and alkoxyalkylethers. Preferred alkoxyalkylether solvents include those in which the alkyl group represents an aliphatic group containing two or fewer carbon atoms; preferred among these are bis(alkoxyalkyl)ethers; more preferred are bis(methoxyalkyl)ethers; particularly preferred of these is diglyme. Preferred polymerization temperatures are in the range of from about 110° C. to about 200° C., more preferably in the range of form about 130° C. to about 160° C. In the embodiment where a solvent is used, the product polyesters may be separated from the solvent by any suitable method, for instance by evaporating the solvent. Another example of a suitable separating method is precipitating the polyesters by adding a non-solvent to the reaction mixture. The precipitate can then be collected by, for instance, filtration or centrifugation. Preferred non-solvents include, inter alia, water and mixtures of water with alcohols, such as water-ethanol mixtures.

Applications

The present polyesters are useful in a wide variety of applications. For instance, the polyesters are useful in polymer blends, coatings, laminates, films, foams, fibers, and in matrix materials for composites. Such composites may comprise any suitable reinforcing material, such as glass-, carbon-, polyamide- (e.g., Kevlar™), or polyester fibers. Also natural materials can be used as reinforcing material, e.g., wood, jute, ramie, flax, bamboo, or sisal.

The present polyesters may be blended with other polymers, preferably thermoplastic polymers. Polymers that may be blended with the present polyesters include, for instance, polyolefins (e.g., polyethylene or polypropylene), thermoplastic starch, and further polyesters (e.g., polyethyleneterephthalate). In one embodiment, such a blend of thermoplastic polymers comprises, relative to the total weight of the blend, 1-99 wt % of the present polyesters. In a further embodiment such a blend comprises 1-40 wt % of the present polyesters, and in an even further embodiment the blend comprises 5-25 wt % of the present polyesters.

Due to their low oxygen transmission rate and/or good adhesion characteristics, the present polyesters are particularly suitable in or as adhesive films, hot-melt adhesives, packaging films, metal and can laminates, and additives for increasing the adhesion and paintability of a variety of materials, such as polyolefins.

Because the present polyesters can have high dielectric properties, the polyesters may also be advantageously used in applications and processes that include radio frequency sealing. Such a process may include bringing a first area of a first article into contact with a second area of a second article. The first and second article may be the same or different. For instance, the first area and second area may each be a region on a different film, but the first and the second area may also be different regions on the same film. Generally both the first and second area have high dielectric properties, and at least one of the first and second area comprises the present polyester. After bringing the first and second area into contact, energy in the radio frequency range (e.g., about 100 kHz-1500 MHz, preferably about 1 MHz-100 MHz, more preferably about 10-50 MHz) is applied to the first and second area and the areas are thus adhered. Particular applications for such a process include, for instance, the sealing of bags or pouches.

Any suitable method may be used to process the present thermoplastic polyesters into various articles. Such methods include, but are not limited to, injection molding, extrusion, compression molding, solution casting, spin casting, melt-spinning, and blow molding.

Additives may be used to further tailor the properties of the polyesters (or of compositions, e.g., polymer blends, comprising the polyesters). For instance, pigments may be added to color the polyesters or polyester compositions. Other suitable additives which may be added include, for instance, antioxidants, flame retardants, and inert fillers. Inert fillers can be both inorganic (e.g., glass beads, talc, silica particles, and clays, for instance nanoclays) or organic (e.g., polysaccharides, modified polysaccharides, and naturally occurring particulate fillers).

The polyesters may be formed into various articles, including, but not limited to, e.g.: a coating, a film, a laminate, a foam, a fiber, an adhesive, or a molded part, a cast part, an extruded part, a melt-formed part; a composite, a conglomerate, a blend; a mass, a slab, a sheet, a fabric, a particle, a powder, a solution, a suspension, a dispersion, a colloid, a gel; a container; a pre-container; a bonded article; a heat-sealed or radiofrequency-sealed or vibrational welding-sealed article; or a heat-sealable or radiofrequency-sealable or vibrational welding-sealable article. As used in this context, the term "part" means "piece," and may be either of: (a) a portion, element, or component of, or intended for inclusion in, a larger object; or (b) an entire object itself.

A "container" as used herein is defined as a receptacle or covering, e.g., a bag, pouch, package, packet, box, jar, bottle, vial, ampoule, or shaped cover. A "pre-container" as used herein is defined as a shaped article designed or intended to be formed into such a receptacle or covering, as by, e.g., folding, wrapping, sealing, welding, joining, connecting, linking, fastening, attaching, and/or affixing, etc., with or without filling of the receptacle or applying of the covering.

A "particle" as used herein is defined as a small mass of any morphology, e.g., a bead, granule, grain, or crystal. A "mass" as used herein is defined as a block, chunk, or bar of any morphology.

A "colloid" as used herein is defined as any one of a sol, a paste, a latex, a smoke, an emulsion, a microemulsion, a micelle composition, and a reverse micelle composition.

A "fabric" as used herein is defined as any material having a woven, felted, plaited, matted, or knitted structure, or any similar fibrous structure.

As used herein, the noun "laminate" is defined as any article in which a polyester according to the present invention is attached to the surface of another object or portion thereof, of any morphology, in a manner that is substantially contiguous throughout a significant area of said surface, i.e. the contact area of the attachment (the "interface") is a significant surface area. The object(s) and the contact area(s) may be of any morphology; thus, the contact area may be substantially of a regular geometry, e.g., substantially planar, substantially cylindrical, substantially spherical, or may deviate widely from any such regular shape or combination of shapes. Such laminates may be prepared either by thus directly attaching a polyester of the present invention to such a surface, or by adhering the polyester thereto by means of a separate adhesive composition or phase. Examples of preferred laminates include, but are not limited to, those in which the polyester forms a layer upon the contact area. Where a laminate is formed in which the polyester is directly attached, the nature of the attachment may be by any mechanism, e.g. by covalent attachment, ionic attachment, hydrogen bonding, or by any other attaching or attracting forces effective for the desired application (e.g., lipophilic attraction, capillary forces, vacuum forces, electrostatic forces).

Where an at least substantially strong adherence of the polyester to the surface is achieved by means of direct attachment, the resulting article may also be referred to as a "bonded" article. Typical attachment modes involved in forming a bonded article include, e.g., covalent attachment, ionic attachment, and/or hydrogen bonding. In a particularly preferred embodiment of a laminate, the article or portion thereof is a bonded article or portion. In a particularly preferred embodiment of a bonded article, the polyester is directly attached to another object of a different material. In a preferred embodiment, the different material will be, e.g., a metal or a glass material. Particularly preferred metal laminates and can laminates are bonded metal articles and bonded can articles.

As used herein, the terms "heat-sealed article," "radiofrequency-sealed article," and "vibrational welding-sealed article" respectively refer to an article that has been formed by a process involving forming at least one seal or weld between at least two points of contact of a polyester or polyesters according to the present invention, wherein said seal or weld is formed by the recited method. Likewise, the terms "heat-sealable article," "radiofrequency-sealable article," and "vibrational welding-sealable article" respectively refer to an article that is susceptible of being sealed or welded by the recited method so as to form at least one seal or weld between at least two points of contact of a polyester or polyesters according to the present invention and that is designed or intended to be formed into a "heat-sealed article," "radiofrequency-sealed article," or "vibrational welding-sealed article" by a process involving forming at least one such seal or weld.

EXAMPLES

The following examples are given as particular embodiments of the present invention and to demonstrate the practice and advantages thereof. It is to be understood that the examples are given by way of illustration and are not intended to limit the specification or the claims that follow in any manner.

Preparation of 10,11-epoxyundecanoic acid

A mixture consisting of 49.52 g of a 32 weight percent peracetic acid solution, 1.48 g of sodium acetate and 86.4 g methylene chloride was added dropwise at 18-20° C. to a stirred solution consisting of 32.0 g undecylenic acid and 363 g methylene chloride. After the addition was complete, the resulting mixture was stirred under reflux at 41° C. for 12 hours, after which the mixture was cooled to room temperature (about 23° C.). The mixture was then further cooled with an ice water bath to a temperature of about 0-10°

C. and 217 g of an aqueous solution of 10 weight % sodium bisulfite was added to the mixture at a rate such that the temperature of the mixture remained below 23° C. An organic layer formed during addition of the bisulfate was recovered using a separatory funnel and washed with 100 ml portions of deionized water until the pH of the washings was between 6 and 7. The organic layer was then dried by adding anhydrous magnesium sulfate and then filtered. The solvent still present in the residue was removed in vacuo at 10 mbars (1000 Pa) with a rotary evaporator in a bath of 52-58° C., to yield 30 g of 10,11-epoxyundecanoic acid. The 10,11-epoxyundecanoic acid was then purified by first dissolving it in an Erlenmeyer flask containing 300 g of ligroin warmed to approximately 50° C. The resulting solution was allowed to cool to room temperature and about 1 g of an oily substance settled on the bottom of the Erlenmeyer flask. The supernatant formed in the flask was subsequently decanted from the oily substance, cooled to about −14° C. and allowed to stand for 16 hours. This yielded a precipitate that was subsequently washed with 150 grams of fresh ligroin. The clears were decanted and the residue obtained was dried at ambient temperature for 24 hours at 10 mbars (1000 Pa) to give 27.8 g of 10,11-epoxyundecanoic acid having a melting point of 48° C.

Example 1

Preparation of a polyhydroxyundecanoate

A solution consisting of 20 g of 10,11-epoxyundecanoic acid (prepared with the procedure described above) and 10 g of diglyme was heated to 50° C., after which 0.2 g of tetrabutylammonium bromide was added to the solution. The resulting solution was further heated to 150° C. and stirred for 6 hours after which heating was discontinued and an additional 30 g of diglyme was added. The resulting solution was then poured into 1.2 liters of a 2:1 by volume water/methanol solution. A precipitate was formed, which was subsequently filtered off and added to 1.2 liters of a fresh 2:1 by volume water/methanol solution. The thus obtained dispersion was shaken for 24 hours using a reciprocating shaker. The dispersion was subsequently filtered and the filtered residue was allowed to air dry at room temperature for 12 hours, after which the dried residue was dissolved in 100 g tetrahydrofuran. The thus obtained solution was poured into 1.2 liters of a 2:1 by volume water/methanol solution and a white fibrous precipitate was formed. The precipitate was filtered off and added to a fresh 1.2 liters of a 2:1 by volume water/methanol solution and shaken for 24 hours using a reciprocating shaker. The precipitate was filtered off and dried in vacuo at less than 10 mbars (1000 Pa) for 24 hours at room temperature. A proton NMR spectrum obtained for this precipitate was consistent with the aforementioned formula (1). Integration of the area under the appropriate NMR signals at 4.8 and 3.5 ppm indicated that the ratio of the amount of units represented by the above formula (1) to the amount of units represented by the above formula (2) was 13:7. Additional analysis conducted for this polymer is given in Table 1.

15 mil (0.38 mm) thick films of this polymer were prepared by compression molding at 200° F. (93.3° C.), and 9500 psi (65.5 MPa). The glass transition temperature, Tg, of these films was determined by dynamic mechanical analysis, which was conducted at a frequency of 1.0 rad/s and a heating rate of 2° C. minute from −150 to 150° C. From this analysis, the glass transition temperature (tan delta peak) was observed to be −8° C. Tensile properties for these films were determined according to ASTM method D882 and are given in Table 2.

Example 2

Preparation of a polyhydroxyundecanoate

Example 1 was repeated using a higher purity 10,11-epoxyundecanoic acid (99.4% versus 96.4% as determined by epoxide titration). In this preparation, the reaction mixture was stirred for 2.5 hours at 150° C. rather than 6 hours. Additionally, the polymer was washed with acetone. The analysis conducted for the resulting polymer is given in Table 1.

15 mil thick films of this polymer were prepared by compression molding at 225° F. (107° C.) and 9500 psi (65.5 MPa). The glass transition temperature of these films was determined by dynamic mechanical analysis, which was conducted at a frequency of 1.0 rad/s and a heating rate of 2° C. minute from −150 to 150° C. From this analysis, the glass transition temperature (tan delta peak) was observed to be −8° C. Tensile properties for these films were determined according to ASTM method D882 and are given in Table 2.

TABLE 1

Properties of polyhydroxyundecanoates

| Properties | Polyester of Example 1 | Polyester of Example 2 |
|---|---|---|
| Weight Average Molecular Weight ($M_w$) - Note 1 | 98,529 g/mol | 173,900 g/mol |
| Number Average Molecular Weight ($M_n$) - Note 1 | 9,409 g/mol | 13,295 g/mol |
| Inherent Viscosity - Note 2 | 0.35 dl/g | 0.85 dl/g |
| Melting Range - Note 3 | 77-105° C. | 76-105° C. |

Note 1
Analysis was conducted by GPC using polystyrene standards.
Note 2
Analysis was conducted according to ASTM method D 2857-95.
Note 3
Melting range was determined by differential scanning calorimetry using a heating rate of 10° C./minute from −50 to 110° C.

TABLE 2

Properties of compression molded films of polyhydroxyundecanoates

| Properties | Polyester of Example 1 | Polyester of Example 2 |
|---|---|---|
| Glass Transition Temperature | −8° C. | −8° C. |
| Tensile Yield strength | 1,714 psi [11.8 Mpa] | 1,558 psi [10.7 Mpa] |
| Tensile Break Strength | 1,576 psi [10.9 Mpa] | 2,261 psi [15.6 Mpa] |
| Elongation at Break | 209% | 580% |
| Young's Modulus | 29,010 psi [200.0 Mpa] | 32,900 psi [226.8 Mpa] |

Example 3

Preparation and Testing of an Adhesive Film Comprising a polyhydroxyundecanoate

Films of polyhydroxyundecanoate prepared according to Example 2 were obtained by compression molding at 220° F. and 2000 psi (104.4° C.; 13.8 MPa). T-peel and lap shear samples were assembled with aluminum T2024 or cold rolled steel by placing the polyhydroxyundecanoate film between the aluminum or cold steel substrate materials and pressing at 230° F. and 500 psi (110° C.; 3.4 MPa). The adhesion results are shown in Table 3.

Comparative Example A

Preparation and Testing of an Adhesive Film Comprising a Linear Low Density polyethylene Films of a commercial linear low density polyethylene (Dowlex™ 2517 by The Dow Chemical Company) were obtained by compression molding at 392° F. and 4000 psi (200° C.; 27.6 MPa). Lap shear samples were assembled with aluminum T2024 by placing the LLDPE film between the aluminum substrate materials and pressing at 392° F. and 4000 psi (200° C.; 27.6 MPa). The adhesion results are shown on Table 3.

seal. The seal obtained could not be peeled off and broke outside of the seal area when stressed to the breaking point.

As a comparison, a flexibilized PVC film (10/1000 inch thick) (0.254 mm) was processed under the same conditions. This film did not form a seal. At higher power output (70%), the flexibilized PVC film provided a seal; however, the PVC film could be peeled off.

Comparative Example B

Preparation and Testing of a Film Comprising a Linear Low Density polyethylene

Fifty grams of a commercial, linear low density polyethylene (Dowlex™ 2517 by The Dow Chemical Company) were processed in a Brabender mixer at 257° F. for ten minutes (125° C.). Thin films (ca. 0.254 mm thick) from this polymer were obtained by compression molding at 284° F.

TABLE 3

| | | Adhesive Properties | | | |
|---|---|---|---|---|---|
| Example | Polymer Used | Peel Strength on Steel (pli) Note 1 | Lap Shear Strength on Steel (psi) Note 2 | Peel Strength on Aluminum (pli) Note 1 | Lap Shear Strength on Aluminum (psi) Note 2 |
| 3 | Polyhydroxy-undecanoate | 9.0 (1.6 N/mm) | 1370 (9.4 MPa) | 8.0 (1.4 N/mm) | 1370 (9.4 MPa) |
| Comp. A | LLDPE | — | — | — | 240 (1.65 MPa) |

Note 1
Peel strength was measured in a T-peel configuration utilizing 32/1000 inch (0.813 mm) thick cold roll steel or aluminum substrates that were previously wiped with methyl ethyl ketone. The T-peel specimens were tested in an Instron tensile tester at a crosshead speed of 10 in/min (254 mm/min).
Note 2
Lap shear strength was measured utilizing 63/1000 inch (1.6 mm) thick cold roll steel or aluminum substrates that were previously wiped with methyl ethyl ketone. A 0.5 inch (12.7 mm) overlap was used. The specimens were tested in an Instron tensile tester at a crosshead speed of 0.10 in/min (2.54 mm/min).

Example 4

Preparation of Films Comprising a polyhydroxyundecanoate and Testing for Barrier Properties Films of polyhydroxyundecanoate prepared according to Example 2 were obtained by compression molding at 220° F. and 2000 psi (104.4° C.; 13.8 MPa). The oxygen permeability coefficient for these films was determined to be 14 cc*mil/100 in$^2$*day*atm by ASTM method D3985-81(i.e. below about $5.4 \times 10^{-5}$ cc*mm/m$^2$*Pa*day). The water vapor transmission rate at steady state for these films was determined to be 13 g*mil/100 in$^2$*day by ASTM F-1249-90(i.e. below about 5.1 g*mm/m$^2$*day).

Example 5

Films Comprising a polyhydroxyundecanoate and Testing for Radio Frequency Sealing An eight inch by eight inch by 10/1000 inch film (20.3 cm×20.3 cm×0.254 mm) of polyhydroxyundecanoate prepared according to Example 2 was obtained by compression molding at 230° F. (110° C.). This film was folded and placed in a radio frequency sealer. A Callanan 2 kW Radio Frequency Sealer was used. This sealer operates at a frequency of 27.12 MHz. The sealing parameters included a 0.5 inch×8 inch (1.27 cm×20.3 cm) brass seal bar that was not heated; a welding time of 1 second, a Clayton capacitance setting of 12; and a 50% power output. Under these conditions, the polyhydroxyundecanoate film formed a very good and 9500 psi (140° C.; 65.5 MPa). The tensile properties for these films were determined following ASTM D882 method. The results are shown in Table 4.

Example 6

Preparation and Testing of a Film Comprising a Blend of LLDPE and a polyhydroxyundecanoate Forty five grams of a commercial, linear low density polyethylene (Dowlex™ 2517 by The Dow Chemical Company) and 5 g of polyhydroxyundecanoate prepared according to Example 2 were blended in a Brabender mixer at 257° F. for ten minutes (125° C.). Thin films (ca. 0.254 mm thick) from this blend were obtained by compression molding at 284° F. and 9500 lbs (140° C.; 65.5 MPa). The tensile properties for these films were determined following ASTM D882 method. The results are shown in Table 4.

Example 7

Preparation and Testing of a Film Comprising a Blend of LLDPE and a polyhydroxyundecanoate 42.5 grams of a commercial, linear low density polyethylene (Dowlex™ 2517 by The Dow Chemical Company) and 7.5 g of polyhydroxyundecanoate prepared according to Example 2 were blended in a Brabender mixer at 257° F. (125° C.) for ten minutes. Thin films (ca. 0.254 mm thick) from this blend were obtained by compression molding at 284° F. and 9500 psi (140° C.; 65.5 MPa). The tensile properties for these films were determined following ASTM method D882. The results are shown in Table 4.

TABLE 4

Tensile Properties of Compression Molded Films

| Example | LLDPE (grams) | Polyhydroxy-undecanoate (grams) | Break Strength | Elongation at Break | Young's Modulus |
|---|---|---|---|---|---|
| Comp. B | 50 | 0 | 1140 psi [7.86 Mpa] | 200% | 70 ksi [483 Mpa] |
| 6 | 45 | 5 | 1190 psi [8.20 Mpa] | 215% | 67 ksi [462 Mpa] |
| 7 | 42.5 | 7.5 | 1180 psi [8.14 Mpa] | 320% | 63 ksi [434 Mpa] |

Having described specific embodiments of the present invention, it will be understood that many modifications thereof will readily be apparent to those skilled in the art, and it is intended therefore that this invention is limited only by the spirit and scope of the following claims.

What is claimed is:

1. A thermoplastic polyester comprising at least one moiety having at least 10 sequential units, said sequential units consisting of units selected from the group consisting of units represented by the following formula (1) and units represented by the following formula (2),

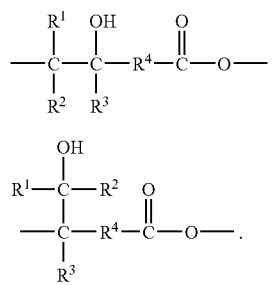

wherein
each of $R^1$ independently represents hydrogen or a substituted or unsubstituted homoalkyl or heteroalkyl group;
each of $R^2$ independently represents hydrogen or a substituted or unsubstituted homoalkyl or heteroalkyl group;
each of $R^3$ independently represents hydrogen or a substituted or unsubstituted homoalkyl or heteroalkyl group;
each of $R^4$ independently represents a substituted or unsubstituted homoalkyl or heteroalkyl group; and
said moiety having no fewer than 1 unit represented by formula (1) and no fewer than 1 unit represented by formula (2).

2. The thermoplastic polyester of claim 1, wherein: for all units of formula (1), all $R^1$ are identical, all $R^2$ are identical, and all $R^3$ are identical; and independently for all units of formula (2), all $R^1$ are identical, all $R^2$ are identical, and all $R^3$ are identical.

3. The thermoplastic polyester of claim 2, wherein: for all units of formula (1), all $R^4$ are identical; and independently for all units of formula (2), all $R^4$ are identical.

4. The polyester of claim 3, wherein $R^1$, $R^2$, $R^3$, and $R^4$ in formula (1) correspond to $R^1$, $R^2$, $R^3$, and $R^4$ in formula (2).

5. The polyester of claim 4, wherein each $R^4$ comprises an unsaturated group.

6. The polyester of claim 5, wherein each $R^4$ is selected from the groups represented by the following formula (6):

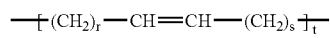

(6)

wherein
r represents an integer of 0 to 20;
s represents an integer of 0 to 20;
r+s=at least 2; and
t represents an integer of 1 to 4.

7. The polyester of claim 4, wherein each $R^4$ comprises a saturated group.

8. The polyester of claim 7, wherein each $R^4$ is selected from the groups represented by the following formulas (4) and (5):

 (4)

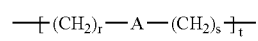 (5)

wherein
q represents an integer of 1 to 30;
r represents an integer of 0 to 20;
s represents an integer of 0 to 20;
r+s=at least 1;
t represents an integer of 1 to 4; and
A represents sulfur, oxygen, or carbonyl.

9. The polyester of claim 8, wherein each $R^4$ is a saturated group containing at least 2 carbon atoms.

10. The polyester of claim 9, wherein each $R^4$ comprises a linear, saturated, homoalkyl group of 8 carbon atoms.

11. The polyester of claim 4, wherein at least one of $R^1$, $R^2$, and $R^3$ is substituted with a substituent selected from the group consisting of hydroxyl, cyano, nitro, chioro, bromo, and fluoro.

12. The polyester of claim 4, wherein each of $R^1$, $R^2$, and $R^3$ independently represents hydrogen or a group represented by the following formula (3):

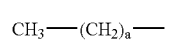 (3)

wherein a represents an integer from 0 to 20.

13. The polyester of claim 12, wherein each of $R^1$, $R^2$, and $R^3$ independently represents hydrogen or a linear, saturated, homoalkyl group of 4 or fewer carbon atoms.

14. The polyester of claim 13, wherein each of $R^1$, $R^2$, and $R^3$ independently represents hydrogen or a linear, saturated, homoalkyl group of 2 or fewer carbon atoms.

15. The polyester of claim 12, wherein all $R^1$, $R^2$, and $R^3$ are identical.

16. The polyester of claim 15, wherein all $R^1$, $R^2$, and $R^3$ represent hydrogen.

17. The polyester of claim 1, wherein said polyester has a weight average molecular weight of at least 5,000 g/mol.

18. The polyester of claim 1, wherein said polyester is derived from a plant oil.

19. The polyester of claim 4, wherein said polyester is derived from a plant oil.

* * * * *